United States Patent [19]

Thesman

[11] Patent Number: 4,466,233
[45] Date of Patent: Aug. 21, 1984

[54] MOWER DRIVE ASSEMBLY
[75] Inventor: Dana F. Thesman, Torrance, Calif.
[73] Assignee: Thesman Industries, Inc., Torrance, Calif.
[21] Appl. No.: 429,209
[22] Filed: Sep. 30, 1982
[51] Int. Cl.³ .................... A01D 69/08; A01D 69/10; F16D 67/02
[52] U.S. Cl. ................. 56/11.3; 192/18 R; 192/14
[58] Field of Search .............. 56/10.8, 11.3, 11.7, 56/11.8, DIG. 6; 192/18 R, 14

[56] References Cited
U.S. PATENT DOCUMENTS

| | | | |
|---|---|---|---|
| 2,891,642 | 6/1959 | Moore | 56/11.3 |
| 2,985,992 | 5/1961 | Dowdle | 56/11.3 |
| 3,026,665 | 3/1962 | Hoff . | |
| 3,116,649 | 1/1964 | Wickman | 192/18 R |
| 3,247,654 | 4/1966 | Nemeth et al. | 56/11.3 |
| 3,253,391 | 5/1966 | Meldahl | 56/11.3 |
| 3,290,871 | 12/1966 | Hass . | |
| 3,461,994 | 8/1969 | Dallman . | |
| 3,543,892 | 12/1970 | DeBaillie . | |
| 3,731,472 | 5/1973 | Kamlakin | 192/18 R |
| 3,871,159 | 3/1975 | Shriver | 56/11.3 |
| 4,035,994 | 7/1977 | Hoff . | |
| 4,037,389 | 7/1977 | Harkness . | |
| 4,044,533 | 8/1977 | Wick . | |
| 4,048,788 | 9/1977 | Kamlukin . | |
| 4,055,935 | 11/1977 | Malion et al. . | |
| 4,122,652 | 10/1978 | Holtermann | 56/11.3 |
| 4,141,439 | 2/1979 | Laude et al. | 192/18 R |
| 4,158,944 | 6/1979 | Rabinow . | |
| 4,213,521 | 7/1980 | Modersohn | 192/18 R |
| 4,221,108 | 9/1980 | Owens . | |
| 4,226,312 | 10/1980 | Zindler . | |
| 4,226,313 | 10/1980 | Meldahl et al. | 192/18 R |
| 4,226,314 | 10/1980 | Mombre . | |
| 4,271,658 | 6/1981 | Foster | 56/11.3 |
| 4,295,327 | 10/1981 | Bortolussi . | |
| 4,306,405 | 12/1981 | Fleigle | 56/11.8 |
| 4,322,935 | 4/1982 | Pochlman | 56/11.3 |
| 4,351,424 | 9/1982 | Lawrence et al. | 56/11.3 |

OTHER PUBLICATIONS

Warner Electric Brake & Clutch Comp, "Lawn Mowes Clutch-Brake Blademaster 250", (9/80).
Mowsafe Products, Inc., Advertisement ill., "Mow Safe Clutch/Brake".

Primary Examiner—Gene Mancene
Assistant Examiner—John G. Weiss
Attorney, Agent, or Firm—Fulwider, Patton, Rieber, Lee & Utecht

[57] ABSTRACT

An improved drive assembly is provided particularly for use with lawn mowers and the like for selectively coupling an engine drive shaft to rotatably drive a mower blade when a control lever is grasped by the operator, and for quickly halting blade rotation when the control lever is released while the engine is running. The drive assembly comprises a drive member secured to the end of the drive shaft and supporting an annular driven member to which the mower blade is connected for rotation relative to the drive member. A clutch ring carried loosely about the drive shaft is coupled for rotation with the driven member by intermeshing sets of relatively large drive teeth movable axially relative to each other to accommodate spring-biased axial clutch ring displacement toward a normal position in frictional engagement with a stationary brake pad on the mower housing to halt driven member rotation. An actuator yoke responsive to retraction of the control lever axially displaces the clutch ring away from the brake pad and into frictional engagement with an upwardly presented drive face on the drive member, thereby imparting rotational motion to the driven member.

23 Claims, 6 Drawing Figures

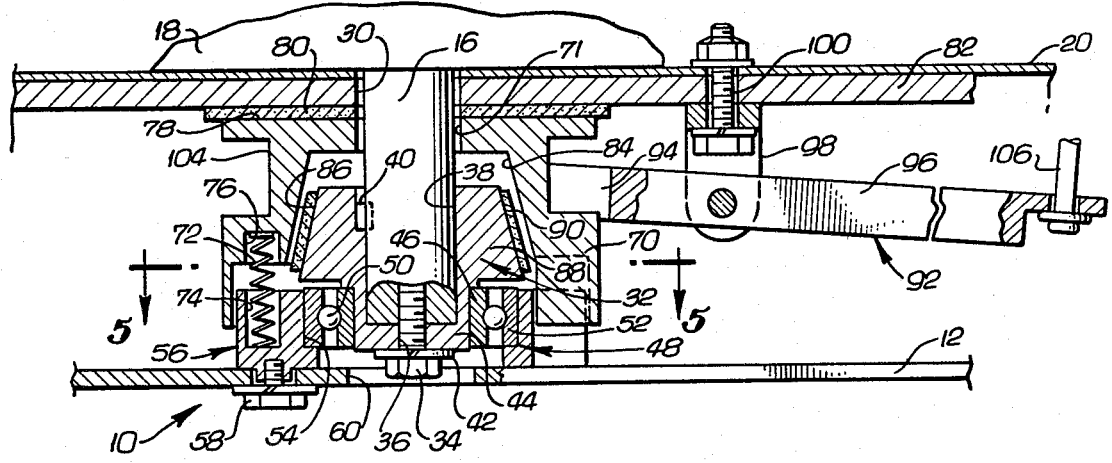

MOWER DRIVE ASSEMBLY

BACKGROUND OF THE INVENTION

This invention relates generally to drive assemblies for use with power-driven implements, such as lawn mowers and the like. More specifically, this invention relates to a simplified and inexpensive yet highly reliable drive assembly of the type including a so-called deadman clutch and brake mechanism for automatically halting rotation of an output or driven member to prevent operator injury.

A variety of drive assemblies including a so-called deadman clutch and/or brake mechanism are known for use with power-driven implements having an engine or motor drive shaft for rotatably driving a tool-carrying driven member. Such mechanisms typically include a control lever or the like mounted in a convenient, exposed position on the implement, wherein the control lever must be grasped and held by the operator to connect the driven member to the engine drive shaft. If the control lever is released for any reason, the mechanism automatically uncouples the driven member from the drive shaft and, if a brake device is provided, quickly stops rotation of the driven member.

Drive assemblies including such clutch and brake mechanisms have been frequently suggested for use with domestic power lawn mowers having an engine for rotatably driving a grass cutting blade at a relatively high rotational speed, wherein this cutting blade has in the past been an all-too-frequent source of serious and sometimes disabling operator injuries occurring primarily when the operator moves away from a safe pushing position behind the mower. Indeed, the relatively high incidence of serious injuries has resulted in governmental safety regulations requiring manufacturers to include automatic clutch/brake mechanisms on domestic lawn mowing equipment.

In the past, clutch and brake mechanisms for lawn mowers have typically comprised relatively complex and expensive devices requiring a relatively large number of mechanical parts, such as centrifugal clutches, multiple disk friction drives, ball or ratchet drives, traction drives, belt drives, band brakes, and the like. However, these prior mechanisms substantially increase the cost of the lawn mower and therefore have not gained market acceptance. Moreover, prior clutch/brake mechanisms have been subject to frequent mechanical failure partially due to the harsh operating environment beneath the mower housing and partially due to an inability to accommodate the requisite driving/braking forces in a compact design which will not increase the overall size of the mower housing.

There exists, therefore, a significant need for a lawn mower drive assembly including a compact and simplified clutch/brake mechanism constructed from a minimum number of inexpensively formed components capable of reliable, long-lived operation in a lawn mower environment. The present invention fulfills this need and provides further related advantages.

SUMMARY OF THE INVENTION

In accordance with the invention, an improved, simplified, and relatively compact drive assembly is provided particularly for use with power lawn mowers or the like. The drive assembly is coupled to the drive shaft of a mower engine at a position beneath a mower housing or deck and couples rotational motion of the drive shaft to a cutting blade whenever a control lever accessibly mounted on the mower handle is held in a retracted position. When the control lever is released, the drive assembly disconnects the cutting blade from the drive shaft while the engine is running and engages a brake pad to halt blade rotation.

In accordance with a preferred form of the invention, the drive assembly includes a drive member bolted and keyed to the lower end of the drive shaft for rotation therewith. The drive member supports a rotational bearing, such as an annular ball bearing, which in turn carries an annular driven member to which the cutting blade is connected. Accordingly, the drive shaft supports both the drive member and the driven member for rotation about the axis of the drive shaft and for rotation of the drive member relative to the driven member.

A clutch ring is carried about the drive shaft for axial movement between the drive member and the mower housing. The clutch ring includes a set of downwardly projecting, radially spaced and relatively large drive teeth in meshing relation with a complementary-shaped set of relatively large drive teeth on the driven member, wherein the sets of drive teeth couple the driven member for rotation with the clutch ring while accommodating axial displacement of the clutch ring toward and away from the driven member.

Springs reacting between the clutch ring and the driven member bias the clutch ring axially toward a normal position in friction engagement with a stationary, brake pad on the mower housing to prevent rotation of the clutch ring, the driven member, and the cutting blade. A yoke assembly including yoke arms extending into an outer circumferential groove in the clutch ring is movable when the control lever is retracted to displace the clutch ring axially downwardly for frictional engagement of an inner cone-shaped clutch face formed thereon with an upwardly presented and generally cone-shaped drive face on the drive member. Accordingly, the drive member rotationally drives the clutch ring which in turn drives the driven member and the cutting blade.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is an enlarged fragmented vertical section of the mower and drive assembly illustrating the drive assembly in a disengaged position of operation;

FIG. 5 is an enlarged fragmented horizontal section taken generally on the line 5—5 of FIG. 4; and FIG. 6 is an enlarged fragmented vertical section generally similar to FIG. 4 but illustrating the drive assembly in an engaged position of operation.

DETAILED DESCRIPTION OF THE PREFERRED EMBODIMENT

Figure 1:
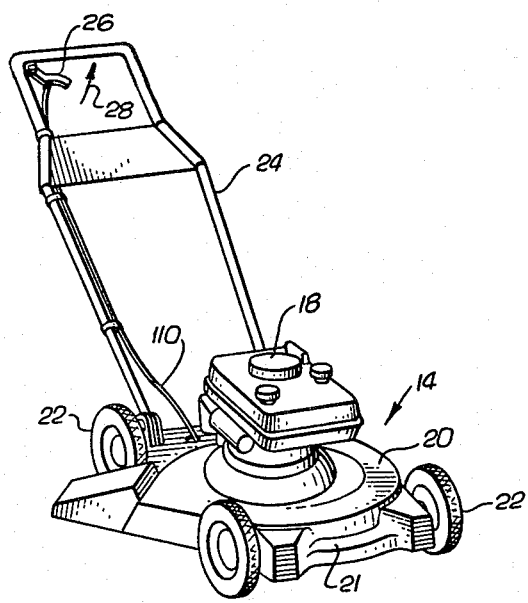
FIG. 1 is a perspective view illustrating an engine-driven lawn mower including a control lever mounted on the handle thereof for controlling operation of the drive assembly of this invention.
Figure 2:
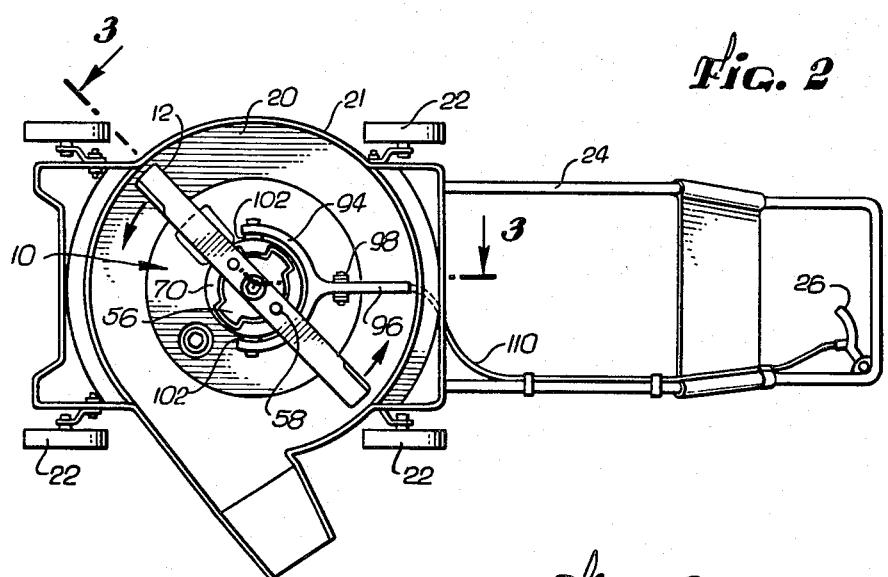
FIG. 2 is a bottom plan view of the mower of FIG. 1 illustrating the drive assembly embodying the novel features of this invention.

As shown in the exemplary drawings, the invention is embodied in an improved and simplified drive assembly referred to generally by the reference numeral 10 and designed particularly for use in controlling rotational driving of a cutting blade 12 in a lawn mower 14. More specifically, the drive assembly 10 is coupled between the mower blade 12 and a drive shaft 16 of an engine 18, which can be a gasoline engine, electric motor, or the like, for controllably rotating the blade 12 at a relatively high speed to cut grass and the like, or alternatively for braking and stopping rotation of the blade 12 for safety purposes while the engine is running.

The drive assembly 10 of this invention is designed primarily for use with a conventional domestic lawn mower 14 of the general type illustrated in FIG. 1 to include the engine 18 bolted to a generally horizontal housing or deck 20 supported above the ground by a plurality of wheels 22 which facilitate rolling movement over a lawn or the like. The engine 18 drives, via the drive assembly 10, the cutting blade 12 positioned beneath the housing 20 for cutting engagement with grass and the like, wherein the housing conventionally includes a depending peripheral skirt 21 to reduce the opportunity for contact between the blade and the operator's hands or feet. A handle 24 upstands rearwardly from the housing 20 for easy grasping to guide and/or push the mower 14 during use.

The present invention provides a simplified yet highly reliable drive assembly 10 including a clutch and brake mechanism constructed from a minimum number of mechanical components which can be formed by relatively economical manufacturing processes. The drive assembly 10 is responsive to the position of a control lever 26 pivotally mounted on the mower handle 24 in an accessible position for manual retraction, as indicated by arrow 28 in FIG. 1, to drivingly connect the cutting blade 12 to the engine drive shaft 16. However, when the control lever 26 is released by the operator, the control lever returns automatically to its initial position and thereby returns the drive assembly 10 to a normal position uncoupling the drive connection between the cutting blade and the engine drive shaft without moving the cutting blade relative to the drive shaft and further associating the blade with a brake device (not shown in FIG. 1) to halt blade rotation rapidly. The drive assembly thus promotes safe mower operation by normally preventing blade rotation thereby avoiding operator injury during engine starting, removal of debris from adjacent the mower, etc., yet blade rotation is easily obtained when the operator stands in a safe pushing position behind the handle 24 and grasps the control lever 26.

The drive assembly 10 is shown in detail in FIGS. 2-6, which illustrate the interconnecting relationship of the drive assembly with the engine drive shaft 16 extending downwardly from the engine 18 through an appropriate central opening 30 in the mower housing 20. The drive shaft 16 projects normally a few inches below the housing 20 and has its lower end connected to a drive member 32. As illustrated best in FIG. 4, this connection is achieved in one preferred form by a bolt 34 fastened upwardly through a lower opening 36 in the drive member and threaded into the lower end of the drive shaft 16, which itself is received into a matingly shaped bore 38 in the drive member 32. A key 40 fitted in aligned axial slots in the drive shaft 16 and the drive member 32 locks the components against rotation relative to each other, and, if desired, a lock washer 42 may be interposed between the head of the bolt 34 and the lowermost surface of the drive member 32 to further maintain the components in a securely locked condition.

The drive member 32, which can be inexpensively formed from a metal casting or the like, includes a lower generally cylindrical section 44 defining a radially outwardly presented shoulder sized for press-fit reception of the inner race 46 of a rotational bearing 48, such as the illustrative annular ball bearing assembly or the like which is preferably sealed and permanently lubricated in a known manner. As shown, this rotational bearing 48 includes a circumferentially arranged set of bearing balls 50 trapped for rolling motion between the inner race 46 and an outer race 52 which is in turn press-fit into a counterbore 54 formed in an annular driven member 56 whereby the drive member 32 supports the driven member 56 for rotation relative thereto about a common central axis of the drive shaft 16. The cutting blade 12 is secured to the driven member 56 by a pair of bolts 58 which are conveniently positioned on opposite sides of a central opening 60 in the blade 12 through which the drive shaft bolt 34 extends to avoid interference therewith.

The driven member 56, which can be inexpensively formed from a metal casting or broaching or the like, includes a set of radially outwardly projecting drive teeth 62 each having a substantial arcuate width, with four of said teeth 62 being illustrated in the drawings by way of example. These drive teeth 62 are radially separated from one another by radially outwardly open slots 64 which also have a substantial arcuate width preferably corresponding with the arcuate widths of the teeth 62.

The drive teeth 62 and associated slots 64 on the driven member 56 are adapted for meshing engagement with a complementary-shaped set of drive teeth 66 separated by correspondingly sized slots 68 on a movable clutch ring 70, which may also be formed from an inexpensive metal casting or the like. More particularly, the clutch ring 70 has a generally annular shape to include a central opening 71 sized for relatively loose, nondriving reception of the drive shaft 16, and further to include an axially downwardly projecting peripheral skirt 65 sized to surround the teeth 62 on the driven member. The skirt 65 is formed integrally with the set of drive teeth 66 which project radially inwardly therefrom into the slots 64 of the driven member 56 for meshing engagement with the driven member drive teeth 62. Importantly, the axial thicknesses of both sets of drive teeth 62 and 66 is sufficient to accommodate axial displacement of the clutch ring 70 relative to the driven member 56 while maintaining the drive teeth in meshed relation such that the clutch ring 70 and driven member 56 are rotatable together at all times.

The clutch ring 70 is urged axially upwardly with respect to the driven member 56 by a plurality of compression springs 72 reacting between the driven member 56 and the clutch ring 70. These springs 72, as shown best in FIGS. 4 and 5, comprise matched helical compression springs preferably having flat-ground ends seated respectively in axially aligned recesses 74 and 76 in the driven member and clutch ring to urge the clutch ring upwardly for frictional engagement of an axially upper friction face 78 on the clutch ring 70 with a brake pad 80 of appropriate brake lining material mounted to the underside of the mower housing 20. As illustrated, this mounting can be achieved by securing the brake pad 80 to a reinforcing mounting plate 82 which in turn can be secured in any suitable manner to the mower housing. Accordingly, the springs 72 function normally to prevent rotation of the clutch ring 70 to correspondingly prevent rotation of the driven member 56 and the cutting blade 12 by virtue of the meshed relationship of the drive teeth 62 and 66.

The clutch ring 70 is axially movable away from the brake pad 80 in a downward direction toward the driven member 56 and against the biasing force of the springs 72 to couple the driven member 56 for driving rotation by the drive member 32. More particularly, the clutch ring 70 includes a truncated conical clutch face 84 for frictional driving engagement with an axially upwardly and generally radially outwardly presented truncated conical drive face 86 of complementary shape formed on an upper drive head portion 88 of the drive member 32. When the clutch ring 70 is moved downwardly about the drive shaft 16, the clutch ring is released from frictional engagement with the brake pad 80 and moves into frictional engagement with the drive face 86 of the drive member, wherein this drive face may be lined with one or more pads 90 of clutch or brake lining material to improve frictional engagement therebetween. The drive member 32 thus rotationally drives the clutch ring 70 which in turn rotationally drives the driven member 56 and the cutting blade 12.

Movement of the clutch ring 70 between frictional engagement with the brake pad 80 or the drive member 32 is controlled by operation of an actuator device, such as the exemplary yoke assembly 92, connected between the clutch ring 70 and the control lever 26 on the mower handle 24. This yoke assembly 92 comprises a generally Y-shaped actuator bar having a pair of actuator arms 94 joined to a common stem 96 which is pivotally supported by an inverted U-shaped bracket 98 secured to the mower housing 20 by a bolt 100 or the like. The free ends of the actuator arms 94 carry roller bearings 102 or the like positioned within a circumferential outer groove 104 in the clutch ring 70, and the free end of the actuator stem 96 is secured to a control cable 106. The control cable 106 extends through a small opening 108 in the mower housing 20 and further through a flexible conduit 110 (FIG. 3) for connection to the control lever 26.

Figure 3:
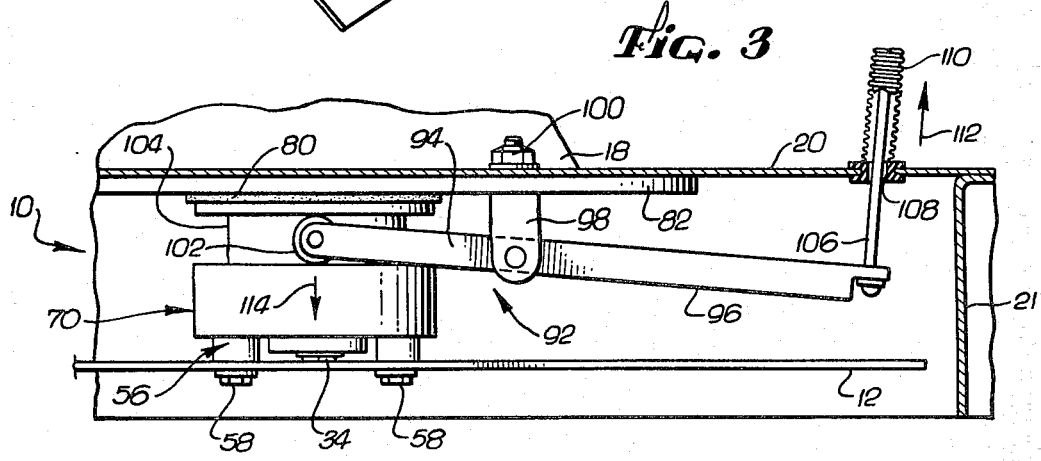
FIG. 3 is an enlarged fragmented vertical section taken generally on the line 3—3 of FIG. 2.

When the control lever 26 is retracted and held by the mower operator, as indicated by the arrow 28 in FIG. 1, the control cable 106 is drawn upwardly as referenced by arrow 112 in FIGS. 3 and 6. This pivots the free ends of the actuator arms 104 downwardly as indicated by the arrow 114 in FIGS. 3 and 6 to correspondingly carry the clutch ring 70 away from the brake pad 80 and into driving engagement with the drive member 32. This driving relationship is maintained as long as the control lever 26 is held in the retracted position resulting in rotation of the cutting blade 12. However, when the control lever 26 is released for any reason, the springs 72 return the clutch ring 70 axially upwardly away from the drive member 32 and into frictional engagement with the brake pad 80, as viewed in FIG. 4, thereby rapidly halting cutting rotation within a few seconds or less.

The drive assembly 10 of this invention thus provides a clutch and brake mechanism for a lawn mower or the like wherein the assembly is constructed from relatively few mechanical parts which can be inexpensively formed. The drive assembly fits compactly between the underside of the mower housing 20 and the cutting blade 12 while supporting the cutting blade in a secure and stable manner along with the drive shaft and in a fixed horizontal plane. The relatively large intermeshing drive teeth 62 and 66 on the driven member 56 and the clutch ring 70 are capable of transmitting relatively large rotational forces without significant risk of mechanical failure, while accommodating relative movement of the clutch ring between driving and braked positions notwithstanding the presence of grass clippings, rocks, and the like encountered beneath the mower housing.

A variety of modifications and improvements to the invention described herein are believed to be apparent to one of ordinary skill in the art. Accordingly, no limitation on the invention is intended, except by way of the appended claims.

What is claimed is:

1. A drive assembly for selective coupling of a rotary tool with a rotatable drive shaft projecting from an implement housing, comprising:
   a drive shaft member secured generally to the end of the drive shaft and having a drive face presented generally toward the implement housing;
   brake means on the implement housing for defining a brake surface presented generally toward said drive face;
   a generally annular driven member for carrying the tool and having a set of relatively large, generally radially extending drive teeth;
   bearing means for mounting said driven member generally about said drive member in an axially fixed position and for rotation relative thereto;
   a clutch ring nondrivingly carried about the drive shaft and including a clutch face for frictional engagement with said drive face and a brake face for frictional engagement with said brake surface, said clutch ring being movable axially relative to the drive shaft between said brake means and said drive member and further including a generally axially extending set of relatively large drive teeth for meshing engagement with said set of driven member drive teeth for rotation of said clutch ring and driven member together throughout axial displacement of said clutch ring; and
   actuator means for axially displacing said clutch ring between a driving position with said clutch face in frictional engagement with said drive face to rotatably drive said clutch ring and driven member and a braking position with said brake face in frictional engagement with said brake surface to halt rotation of said clutch ring and driven member.

2. The drive assembly of claim 1 including spring means reacting between said clutch ring and said driven member for urging said clutch ring normally toward said braking position.

3. The drive assembly of claim 1 wherein said drive face and said clutch face have generally complementary, truncated conical configurations.

4. The drive assembly of claim 3 wherein at least one of said drive face and clutch face is lined at least in part with a relatively high friction coefficient lining material.

5. The drive assembly of claim 1 wherein said brake means comprises a pad of relatively high friction coefficient material secured with respect to the implement housing generally about the drive shaft.

6. The drive assembly of claim 5 including a reinforcing plate mounted on the implement housing generally about the drive shaft, said brake pad being mounted to said reinforcing plate.

7. The drive assembly of claim 1 wherein said clutch ring has an external circumferential groove formed therein, said actuator means including a pivot member mounted on the implement housing for pivoting movement relative thereto, said pivot member having a portion thereof extending into said clutch ring groove for axially displacing said clutch ring in response to pivoting movement of said pivot member.

8. The drive assembly of claim 1 wherein said drive member and said driven member are rotatable generally about a central axis of the drive shaft.

9. The drive assembly of claim 1 wherein said clutch ring further includes an axially extending peripheral skirt generally circumscribing said set of driven member drive teeth.

10. A drive assembly for selective coupling of a rotary tool with a rotatable drive shaft projecting from an implement housing, comprising:
   a drive member secured generally to the end of the drive shaft and having a drive face presented generally toward the implement housing;
   a generally annular driven member for carrying the tool and having a set of generally radially outwardly extending drive teeth, said driven member being supported about said drive member in an axially fixed position and for rotation relative thereto; and
   a clutch ring nondrivingly carried about the drive shaft generally between said drive member and the implement housing, said clutch ring including a generally axially extending set of drive teeth for meshing engagement with said set of driven member drive teeth for rotation of said clutch ring and driven member together throughout axial displacement of said clutch ring and a clutch face presented generally toward said drive face, said clutch ring being axially movable relative to the drive shaft between a first position with said clutch face in frictional engagement with said drive face to rotatably drive said clutch ring and driven member, and a second position with said clutch face axially spaced from said drive face.

11. The drive assembly of claim 10 including spring means reacting between said clutch ring and said driven member for urging said clutch ring normally toward said second position.

12. The drive assembly of claim 10 wherein said drive face and said clutch face have generally complementary, truncated conical configurations.

13. The drive assembly of claim 10 including brake means on the implement housing for defining a brake surface presented generally toward said clutch ring, said clutch ring being frictionally engageable with said brake means in said second position to prevent rotation of said clutch ring and driven member.

14. The drive assembly of claim 13 wherein said brake means comprises a pad of relatively high friction coefficient material secured with respect to the implement housing generally about the drive shaft.

15. The drive assembly of claim 10 including actuator means for axially displacing said clutch ring between said first and second positions.

16. The drive assembly of claim 10 wherein said sets of drive teeth on said clutch ring and driven member respectively comprise sets of relatively large, complementary-shaped teeth.

17. The drive assembly of claim 10 wherein said clutch ring further includes an axially extending peripheral skirt generally circumscribing said set of driven member drive teeth.

18. A drive assembly for selective coupling of a mower blade to a mower drive shaft projecting from a mower housing, comprising:
   a drive member secured generally to the end of the drive shaft and having a truncated conical drive face presented generally toward the mower housing;
   brake means on the mower housing for defining a brake surface presented generally toward said drive face;
   a generally annular driven member for carrying the tool and having a set of relatively large, generally radially extending drive teeth;
   bearing means for mounting said driven member generally about said drive member in an axially fixed position and for rotation relative thereto;
   a clutch ring nondrivingly carried about the drive shaft and including a truncated conical face for frictional engagement with said drive face and a brake face for frictional engagement with said brake surface, said clutch ring being movable axially relative to the drive shaft between said brake means and said drive member and further including a generally axially extending set of relatively large drive teeth for meshing engagement with said set of driven member drive teeth for rotation of said clutch ring and driven member together throughout axial displacement of said clutch ring;
   spring means reacting between said clutch ring and said driven member for urging said clutch ring normally toward said braking position; and
   actuator means for axially displacing said clutch ring between a driving position with said clutch face in frictional engagement with said drive face to rotatably drive said clutch ring and driven member and a braking position with said brake face in frictional engagement with said brake surface to halt rotation of said clutch ring and driven member.

19. The drive assembly of claim 18 wherein at least one of said drive face and clutch face is lined at least in part with a relatively high friction coefficient lining material.

20. The drive assembly of claim 18 wherein said brake means comprises a pad of relatively high friction coefficient material secured with respect to the mower housing generally about the drive shaft.

21. The drive assembly of claim 18 wherein said drive member and said driven member are rotatable generally about a central axis of the drive shaft.

22. The drive assembly of claim 18 wherein said clutch ring further includes an axially extending peripheral skirt generally circumscribing said set of driven member drive teeth.

23. The drive assembly of claim 18 wherein said clutch ring has an external circumferential groove formed therein, said actuator means comprising a pivot member having a pair of yoke arms extending into said clutch ring groove, a bracket for pivotally securing said pivot member to the mower housing for pivoting movement to displace said clutch ring between said driving and braking positions, a control lever pivotally mounted in an accessible position on the mower, and cable means coupled between said control lever and said pivot member for pivoting said pivot member in response to control lever pivoting movement.

* * * * *